United States Patent
Kim et al.

(10) Patent No.: US 9,516,691 B2
(45) Date of Patent: Dec. 6, 2016

(54) METHOD AND APPARATUS FOR PROVIDING PROXIMITY SERVICE IN WIRELESS COMMUNICATION SYSTEM

(71) Applicant: LG ELECTRONICS INC., Seoul (KR)

(72) Inventors: Hyunsook Kim, Anyang-si (KR); Jaehyun Kim, Anyang-si (KR); Laeyoung Kim, Anyang-si (KR); Taehyeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/371,395

(22) PCT Filed: Jan. 16, 2013

(86) PCT No.: PCT/KR2013/000318
§ 371 (c)(1),
(2) Date: Jul. 9, 2014

(87) PCT Pub. No.: WO2013/109040
PCT Pub. Date: Jul. 25, 2013

(65) Prior Publication Data
US 2015/0004984 A1    Jan. 1, 2015

Related U.S. Application Data

(60) Provisional application No. 61/587,123, filed on Jan. 16, 2012, provisional application No. 61/602,604, (Continued)

(51) Int. Cl.
*H04W 76/04* (2009.01)
*H04W 4/00* (2009.01)
*H04W 36/00* (2009.01)

(52) U.S. Cl.
CPC .......... *H04W 76/043* (2013.01); *H04W 4/005* (2013.01); *H04W 4/008* (2013.01); *H04W 36/0016* (2013.01); *H04W 36/0055* (2013.01)

(58) Field of Classification Search
CPC ............ H04W 76/023; H04W 76/043; H04W 36/0072; H04W 36/16; H04W 36/0055; H04W 84/18; H04W 88/06; H04W 12/10; H04W 36/0005; H04W 36/30; H04W 4/005; H04W 4/02; H04W 52/0216; H04W 52/0219; H04W 60/00; H04W 68/02; H04W 76/046; H04W 8/005; H04W 7/18558; H04L 65/1016; H04L 67/12
See application file for complete search history.

(56) References Cited

U.S. PATENT DOCUMENTS 7,502,624 B2 *  3/2009  Rasanen .................... 455/552.1
8,812,349 B2 *  8/2014  Chen et al. .................. 705/7.35
(Continued)

FOREIGN PATENT DOCUMENTS

KR    10-2005-0101692    10/2005
KR    10-0701853         3/2007
(Continued)

OTHER PUBLICATIONS

PCT International Application No. PCT/KR2013/000318, Written Opinion of the International Searching Authority dated May 7, 2013, 1 page.
(Continued)

*Primary Examiner* — Matthew Sams
(74) *Attorney, Agent, or Firm* — Lee, Hong, Degerman, Kang & Waimey

(57) ABSTRACT

The present invention relates to a method for a base station to control a proximity service (ProSe) in a wireless com-
(Continued)

munication system including the steps of: tracking at least two or more terminals which camp on the base station and have a ProSe relationship with each other on a direct data path; and determining whether to switch the direct data path in the case where one or more terminals from among the two or more terminals try to perform a handover or in the case where the distance between the two or more terminals is equal to or greater than a preset value.

20 Claims, 8 Drawing Sheets

Related U.S. Application Data filed on Feb. 24, 2012, provisional application No. 61/683,695, filed on Aug. 15, 2012.

(56) References Cited

U.S. PATENT DOCUMENTS

| | | | |
|---|---|---|---|
| 9,237,590 B2 * | 1/2016 | Novak | H04W 76/023 |
| 2005/0232212 A1 * | 10/2005 | Kang et al. | 370/338 |
| 2010/0177681 A1 * | 7/2010 | Sahinoglu | G01S 5/12 |
| | | | 370/328 |
| 2010/0279672 A1 | 11/2010 | Koskela et al. | |
| 2010/0302009 A1 | 12/2010 | Hoeksel et al. | |
| 2011/0098043 A1 * | 4/2011 | Yu et al. | 455/435.1 |
| 2013/0046821 A1 * | 2/2013 | Alanara | H04W 52/0216 |
| | | | 709/204 |
| 2013/0244661 A1 * | 9/2013 | Lin | H04W 76/023 |
| | | | 455/436 |
| 2013/0315079 A1 * | 11/2013 | Edge | H04W 4/02 |
| | | | 370/252 |
| 2014/0071950 A1 * | 3/2014 | Jang | H04W 36/30 |
| | | | 370/331 |
| 2014/0105178 A1 * | 4/2014 | Jang | H04W 36/0055 |
| | | | 370/331 |

FOREIGN PATENT DOCUMENTS

| | | | |
|---|---|---|---|
| WO | 2010/102668 | 9/2010 | |
| WO | 2011/069295 | 6/2011 | |
| WO | WO 2011/109027 A1 * | 9/2011 | H04W 36/00 |

OTHER PUBLICATIONS

Korean Intellectual Property Office U.S. Appl. No. 10-2014-7018911, Notice of Allowance dated Nov. 26, 2015, 2 pages.

* cited by examiner

FIG. 3
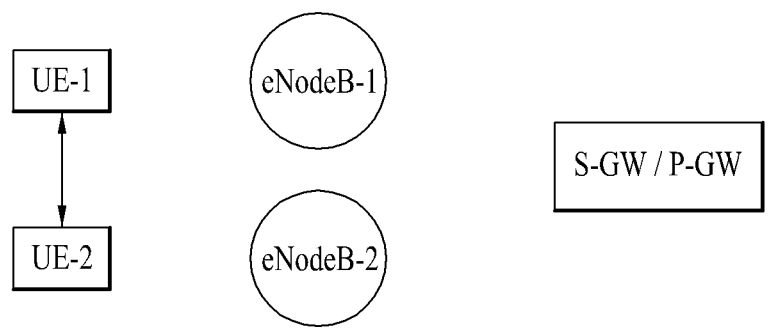
(a)
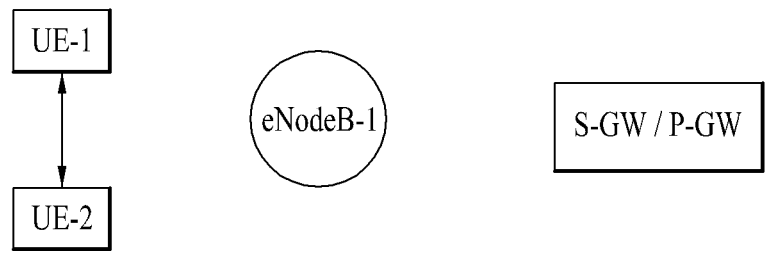
(b)

METHOD AND APPARATUS FOR PROVIDING PROXIMITY SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2013/000318, filed on Jan. 16, 2013, which claims the benefit of U.S. Provisional Application Ser. No. 61/587,123, filed on Jan. 16, 2012, 61/602,604, filed on Feb. 24, 2012 and 61/683,695, filed on Aug. 15, 2012, the contents of which are all hereby incorporated by reference herein in their entirety.

TECHNICAL FIELD

The following description relates to a wireless communication system, and more particularly, to a method and apparatus for providing proximity service.

BACKGROUND ART

Proximity Service ProSe means a solution for supporting communication between devices physically located to be proximate to each other. In more detail, ProSe is intended to discover an application which is operated in proximate devices and finally support an exchange operation of application-related data.

For example, it may be considered that ProSe is applied to applications such as social network service (SNS), business, and games.

ProSe may be referred to as device-to-device (D2D) communication. In other words, ProSe means a communication scheme that a direct link is configured between a plurality of devices (for example, user equipments (UEs) to allow the devices to directly transmit and receive user data (for example, voice, multimedia data, etc.) to and from each other without through a network. ProSe communication may include user equipment-to-user equipment (UE-to-UE) communication, peer-to-peer communication, etc. Also, the ProSe communication scheme may be applied to machine-to-machine (M2M) communication, machine type communication (MTC), etc. Accordingly, ProSe is considered as a solution for solving load of a base station, which is caused by data traffic which is rapidly increased. Also, with the introduction of ProSe, advantages of process reduction of the base station, power consumption reduction of devices which join in ProSe, increase of data transmission rate, increase of network capacity, load distribution, cell coverage enlargement, etc. will be expected.

DISCLOSURE

Technical Problem

Although the need of the introduction of ProSe has been discussed as described above, a detailed solution for a mechanism for supporting and controlling ProSe has not been suggested.

Accordingly, an object of the present invention devised to solve the conventional problem is to provide a control mechanism for signaling a control plane for operator/network control, generating a direct data path between a network node and a base station under the control of the network node and the base station, and notifying the network node of the generated result and various kinds of information related to ProSe. Also, another object of the present invention is to provide a method for controlling a ProSe relation of the direct data path generated as above if there is any change in a geographical location or logical location (for example, relative location based on signal strength even though there is no physical movement) between two or more user equipments having ProSe relation of the direct data path.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a first technical aspect of the present invention, a method for controlling control a proximity service (ProSe) of a base station in a wireless communication system comprises the steps of tracing at least two or more user equipments which camp on the base station and have a ProSe relation with each other on a direct data path; and determining whether to switch the direct data path in the case where one or more of the two or more user equipments intend to perform a handover or in the case where a distance between the two or more user equipments is increased to be more than a predetermined value.

In a second technical aspect of the present invention, a base station for supporting a proximity service (ProSe) of a user equipment in a wireless communication system comprises a transceiving module; and a processor configured to control the transceiving module, wherein the processor traces at least two or more user equipments which camp on the base station and have a ProSe relation with each other on a direct data path, and determines whether to switch the direct data path in the case where one or more of the two or more user equipments intend to perform a handover or in the case where a distance between the two or more user equipments is increased to be more than a predetermined value.

The first and second technical aspects of the present invention may include all or some of the following matters.

The method may further comprise the steps of receiving a ProSe control or permission request for forming the direct data path; and transmitting the ProSe control or permission request to a mobility management entity (MME) by including information related to the ProSe in the ProSe control or permission request.

In the case where any one of the two or more user equipments intends to perform handover, the base station may determine to switch the direct data path to an infrastructure path.

In the case where any one of the two or more user equipments intends to perform handover and the distance between the two or more user equipments is less than the predetermined value even after the handover is performed, the base station may determine to maintain the direct data path.

In the case where the two or more user equipments intend to perform handover and one target base station exists, the base station may determine to maintain the direct data path.

In the case where the distance between the two or more user equipments is increased to be more than the predetermined value, the base station may determine to switch the direct data path to a direct data path through a local base station.

In the case where all of the two or more user equipments intend to perform handover and two target base stations exist, the base station may determine to switch the direct data path to an infrastructure data path.

The base station may consider at least one or more of subscriber information of the two or more user equipments, capability information of the two or more user equipments and target base station, enable/disable information of the capability information, home/local operator policy, preference information, pre-configuration information of a network, pre-configuration policy/preference information of the base station, and congestion status information of the network/base station, when determining whether to switch the direct data path.

Switching of the direct data path may be determined in a unit of session or flow.

The method may further comprise the step of transmitting the determined result to a network node to generate the infrastructure data path determined to be switched from the data direct path.

In the case where the two or more user equipments maintain connection with the network node, the infrastructure data path may be generated in a unit of bearer.

The method may further comprise the step of transmitting a handover request message for the direct data path from the base station to the target base station.

The handover request message for the direct data path may include at least one or more of identifiers of the two or more user equipments having the direct data path, context information of the direct data path, history information, and quality of service (QoS) and charging related information.

In the case where a message including a handover command is received from the target base station, the base station may transmit context related to the ProSe to the target base station.

The information related to ProSe may include at least one or more of information as to whether a function of the base station that may support ProSe is set and status information as to whether the base station may support ProSe which is requested.

Advantageous Effects

According to the present invention, a detailed solution of a control mechanism for achieving ProSe may be provided. Also, even though a geographical location or logical location of user equipments having ProSe relation of direct data path/infrastructure data path is varied, path control may be performed to efficiently support ProSe.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram illustrating a direct mode data path between two UEs based on ProSe;

BEST MODE FOR CARRYING OUT THE INVENTION

Figure 1:
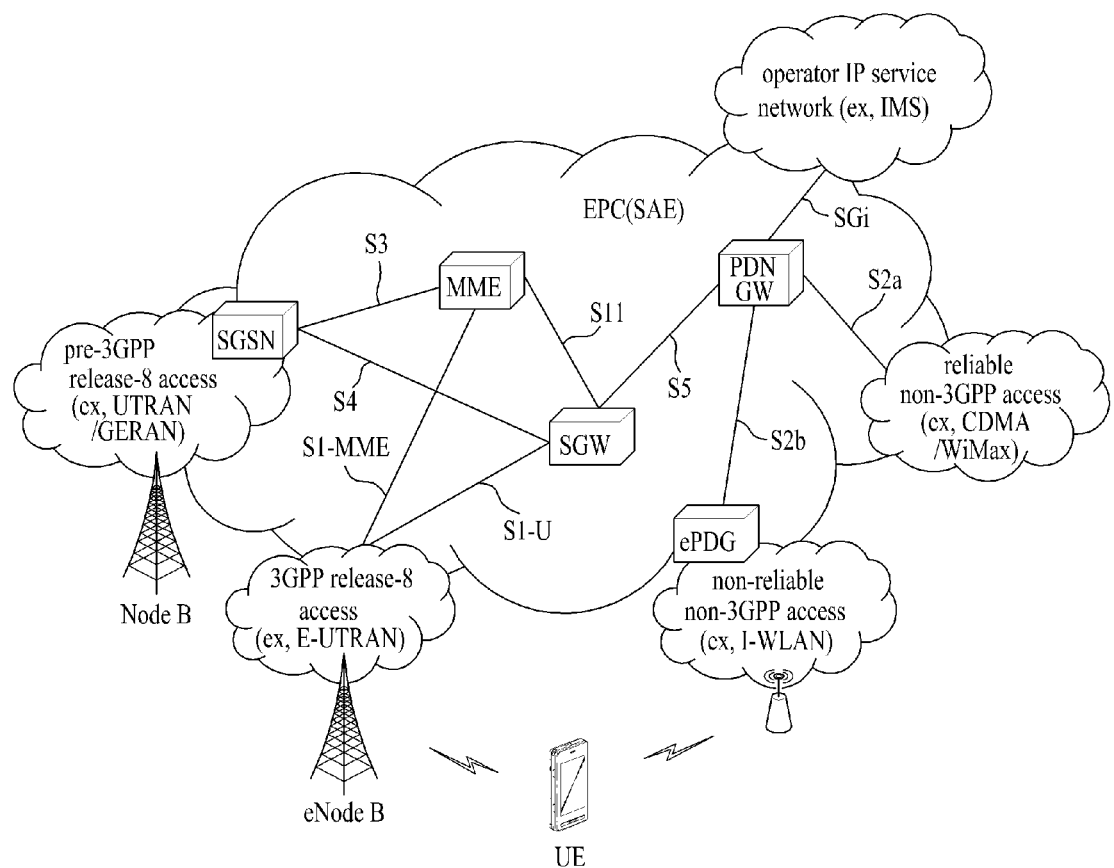
FIG. 1 is a diagram illustrating a brief structure of an Evolved Packet System (EPS) that includes an Evolved Packet Core (EPC)

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless communication systems. Although the following description will be made based on the 3GPP LTE and 3GPP LTE-A system for clarification, it is to be understood that the technical spirits of the present invention are not limited to the 3GPP LTE and 3GPP LTE-A system.

Terminologies used herein will be defined as follows.

UMTS (Universal Mobile Telecommunications System): GSM (Global System for Mobile Communication) based third generation mobile communication technology developed by the 3GPP.

EPS (Evolved Packet System): Network system that includes an EPC (Evolved Packet Core) which is an IP based packet switched core network and an access network such as LTE and UTRAN. This system is the network of an evolved version of the UMTS.

NodeB: Base station of GERAN/UTRAN. This base station is installed outdoor and its coverage has a scale of a macro cell.

eNodeB: Base station of LTE. This base station is installed outdoor and its coverage has a scale of a macro cell.

UE (User Equipment): The UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The UE enables communication through 3GPP spectrum such as LTE and/or non-3GPP spectrum such as WiFi and spectrum for public safety.

Proximity Services or Proximity-based Services (ProSe): Service that enables discovery between physically proximate devices, and mutual direct communication/communication through a base station/communication through the third party. At this time, user plane data are exchanged through a direct data path without through a 3GPP core network (for example, EPC).

Proximity: Whether a UE is proximate to another UE is determined depending on whether a predetermined proximity reference is satisfied. Proximity reference may be given differently for ProSe discovery and ProSe communication. Also, proximity reference may be set to a control target of an operator.

ProSe Discovery: Procedure for identifying whether a UE is proximate to another UE by using E-UTRA.

ProSe Communication: Communication between proximate UEs, which is performed through a communication path established between UEs. The communication path may be formed directly between the UEs, or may be routed through a local base station (s) eNodeB.

ProSe-enabled UE: UE that supports ProSe discovery and/or ProSe communication.

ProSe-enabled Network: Network that supports ProSe discovery and/or ProSe communication.

RAN (Radio Access Network): Unit that includes NodeB, eNodeB and RNC (Radio Network Controller) for controlling NodeB and eNodeB at a 3GPP network. RAN exists between the UE and the core network and provides connection to the core network.

HLR (Home Location Register)/HSS (Home Subscriber Server): Database having subscriber information within the 3GPP network. The HSS may perform functions such as configuration storage, identity management, and user status storage.

RANAP (RAN Application Part): Interface between RAN and a node (MME (Mobility Management Entity)/SGSN (Serving GPRS (General Packet Radio Service) Supporting Node)/MSC (Mobiles Switching Center)) for handling control of the core network.

PLMN (Public Land Mobile Network): Network intended to provide individuals with mobile communication services. This network may be configured for each operator.

NAS (Non-Access Stratum): Functional layer for transmitting and receiving signaling and traffic message between the UE and the core network at a UMTS protocol stack. Main functions of this layer support mobility of the UE, and support a session management procedure of establishing and maintaining IP connection between the UE and a packet data network gateway (PDN GW).

HNB (Home NodeB): CPE (Customer Premises Equipment) that provides UTRAN (UMTS Terrestrial Radio Access Network) coverage. More detailed matters may be understood with reference to standard document TS 25.467.

HeNB (Home eNodeB): CPE (Customer Premises Equipment) that provides E-UTRAN (Evolved-UTRAN) coverage. More detailed matters may be understood with reference to standard document TS 36.300.

CSG (Closed Subscriber Group): Subscriber group allowed to access one or more CSG cells within a PLMN (Public Land Mobile Network) as a member of CSG of H(e)NB.

LIPA (Local IP Access): IP capable UE accesses an entity having another IP function within the same residential/enterprise IP network through H(e)NB. LIPA traffic does not pass a mobile operator network. The 3GPP release-10 system provides access to resources on a local network (that is, network located in a house of a customer or a company) through H(e)NB.

SIPTO (Selected IP Traffic Offload): 3GPP release-10 system supports user traffic handover by allowing an operator to select a Packet data network GateWay (PGW) physically proximate to the UE at the EPC network.

PDN (Packet Data Network) connection: Logical connection between UE expressed as one IP address (one IPv4 address and/or one IPv6 prefix) and PDN expressed as APN (Access Point Name).

EPC (Evolved Packet Core)

FIG. 1 is a diagram illustrating a brief structure of an Evolved Packet System (EPS) that includes an Evolved Packet Core (EPC).

The EPC is a core element of a system architecture evolution (SAE) for improving throughput of 3GPP technologies. The SAE corresponds to a study solution that determines a network architecture that supports mobility among various kinds of networks. For example, the SAE is intended to provide an optimized packet-based system to support various radio access technologies based on IP and provide more improved data transmission capability.

In more detail, the EPC is a core network of IP mobile communication system for the 3GPP LTE system, and may support packet-based real time and non-real time services. In the existing mobile communication system (that is, second or third generation mobile communication system), functions of the core network may be implemented through two separate sub-domains, that is, a circuit-switched (CS) domain for voice and a packet-switched (PS) domain for data. However, in the 3GPP LTE system which is an evolved version of the third generation mobile communication system, the sub-domains such as CS and PS domains have been unified into one IP domain. In other words, in the 3GPP LTE system, connection between user equipments having IP capability may be configured through IP based base station (for example, eNodeB (evolved NodeB), EPC, and application domain (for example, IP multimedia subsystem (IMS)). In other words, the EPC is an essential structure for end-to-end IP service.

The EPC may include various elements, some of which are shown in FIG. 1. That is, SGW (Serving Gateway), PDN GW (Packet Data Network Gateway), MME (Mobility Management Entity), SGSN (Serving GPRS (General Packet Radio Service) Supporting Node), ePDG (enhanced Packet Data Gateway) are shown in FIG. 1.

The SGW is operated as a boundary point between the radio access network (RAN) and the core network, and is an element that serves to maintain a data path between the eNodeB and the PDN GW. Also, if the user equipment moves to an area served by eNodeB, the SGW serves as a local mobility anchor point. In other words, for mobility within E-UTRAN (Evolved-UMTS (Universal Mobile Telecommunications System) Terrestrial Radio Access Network) defined after 3GPP release-8), packets may be routed through the SGW. Also, the SGW may serve as an anchor point for mobility with another 3GPP network (RAN defined before 3GPP release-8, for example, UTRAN or GERAN (GSM (Global System for Mobile Communication)/EDGE (Enhanced Data rates for Global Evolution) Radio Access Network)).

The PDN GW (or P-GW) corresponds to a termination point of a data interface towards the packet data network. The PDN GW may support policy enforcement features, packet filtering, charging support, etc. Also, the PDN GW may serve as an anchor point for mobility management with 3GPP network and non-3GPP network (for example, non-reliable network such as I-WLAN (Interworking Wireless Local Area Network) and reliable network such as CDMA (Code Division Multiple Access) network or WiMax).

In the example of the network architecture of FIG. 1, although the SGW and the PDN GW are configured as separate gateways, two gateways may be implemented in accordance with a single gateway configuration option.

The MME is the element for performing signaling and control functions for supporting access to network connection of UE, allocation of network resources, tracking, paging, roaming and handover. The MME controls control plane functions related to subscriber and session management. The MME manages many eNodeBs, and performs signaling for selection of gateway according to the related art for handover to another 2G/3G network. Also, the MME performs functions such as Security Procedures, Terminal-to-network Session Handling, and Idle Terminal Location Management.

The SGSN performs handling of all the packet data, such as mobility management and authentication of a user to another 3GPP network (for example, GPRS network).

The ePDG serves as a security node for non-3GPP network (for example, I-WLAN, WiFi hotspot, etc.) which is not reliable.

As described with reference to FIG. 1, the user equipment having IP capability may access an IP service network (for example, IMS), which is provided by an operator, through various elements within the EPC even based on non-3GPP access as well as 3GPP access.

Also, various reference points (for example, S1-U, S1-MME, etc.) are shown in FIG. 1. In the 3GPP system, a conceptional link that exists in different functional entities of E-UTRAN and EPC and links two functions will be defined as a reference point. The following Table 1 summarizes reference points shown in FIG. 1. In addition to the examples of Table 1, various reference points may exist depending on the network architecture.

TABLE 1

| Reference point | Description |
| --- | --- |
| S1-MME | Reference point for the control plane protocol between E-UTRAN and MME |
| S1-U | Reference point between E-UTRAN and Serving GW per bearer user plane tunneling and inter eNodeB path switching during handover |
| S3 | Reference point enables user and bearer information exchange for inter 3GPP access network mobility in idle and/or active state. This reference point can be used intra-PLMN or inter-PLMN (e.g. in case of Inter-PLMN handover (HO)). |
| S4 | Reference point between SGW and SGSN provides related control and mobility support between GPRS Core and the 3GPP Anchor function of Serving GW. In addition, if Direct Tunnel is not established, it provides the user plane tunneling. |
| S5 | Reference point provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW. |
| SGi | Reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interface. S2a is the reference point that provides related control and mobility support between the reliable non-3GPP access and the PDNGW to the user plane. S2b is the reference point that provides related control and mobility support between the ePDG and the PDNGW to the user plane.

Control Mechanism for Providing Proximity Service (ProSe)

The present invention suggests a control mechanism for supporting proximity service (ProSe) or D2D service in a mobile communication system such as 3GPP EPS (Evolved Packet System).

Recently, request for recognition/discovery and special application/service (that is, proximity-based application/service) between users/devices physically located to be proximate to each other has been issued due to increase of user requirements for social network service (SNS), etc. In accordance with activity for providing such services, in the 3GPP mobile communication system, possible use case and scenario for ProSe and possible service requirement have been discussed.

Examples of possible use case of ProSe may include commercial/social service, network offload, public safety, and existing infrastructure service integration (this is intended to assure consistency of user experience that includes reachability and mobility aspects). Also, use cases for public safety (in this case, it makes a condition that public safety satisfies regulation of a specific zone and operator policy, and it should be considered that public safety should be limited to specific frequency band designated for public safety and specific user equipments) in case that E-UTRAN coverage is not provided and possible requirements are being discussed.

In particular, discussion of ProSe is being under the progress in the 3GPP on the assumption that proximity-based application/service is provided through LTE or WLAN, and that discovery and communication between devices are performed under the control of operator/network.

Figure 2:
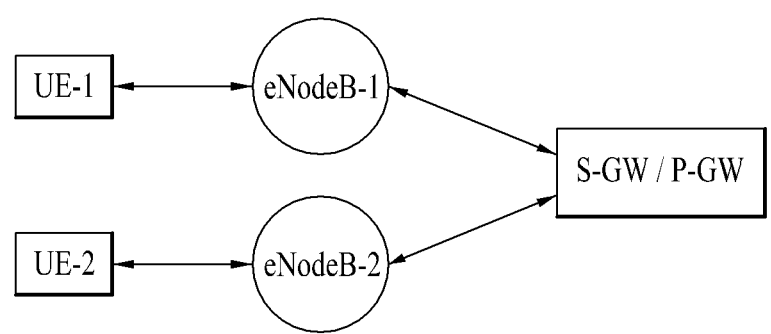
FIG. 2 is a diagram illustrating a default data path through which two user equipments UEs perform communication in an EPS.

FIG. 2 is a diagram illustrating a default data path through which two user equipments UEs perform communication in an EPS. In other words, FIG. 2 exemplarily illustrates a data path between UE-1 and UE-2 in normal case that ProSe between UE-1 and UE-2 is not applied. This default data path passes through the base station (that is, eNodeB or Home eNodeB) and gateway nodes (that is, EPC or operator network). For example, as shown in FIG. 2, when UE-1 and UE-2 transmit and receive data to and from each other, data from the UE-1 may be transferred to the UE-2 through eNodeB-1, S-GW/P-GW and eNodeB-2. Likewise, data from the UE-2 may be transferred to the UE-1 through eNodeB-2, S-GW/P-GW and eNodeB-1. Although FIG. 2 illustrates that the UE-1 and the UE-2 camp on their respective eNodeBs different from each other, the UE-1 and the UE-2 may camp on the same eNodeB. Also, FIG. 2 illustrates that two UEs receive services from S-GW and P-GW, services of various combinations may be provided thereto. In other words, two UEs may receive services from the same S-GW and their respective P-GWs different from each other, receive services from their respective S-GWs different from each other and the same P-GW, or receive services from their respective S-GWs different from each other and their respective P-GWs different from each other.

In the present invention, this default data path may be referred to as infrastructure path, infrastructure data path, or infrastructure communication path. Also, communication through the infrastructure data path may be referred to as infrastructure communication.

FIG. 3 is a diagram illustrating a direct mode data path between two UEs based on ProSe. This direct mode communication path does not pass through the base station (that is, eNodeB or Home eNodeB) and gateway nodes (that is, EPC).

FIG. 3(a) illustrates that UE-1 and UE-2 transmit and receive data to and from each other through a direct mode communication path while camping on their respective eNodeBs (that is, eNodeB-1 and eNodeB-2). FIG. 3(b) illustrates that UE-1 and UE-2 which camp on the same eNodeB (that is, eNodeB-1) transmit and receive data to and from each other through a direct mode communication path.

In the meantime, a data path of a user plane is directly formed between the UEs without through the base station or the gateway node as shown in FIG. 3, whereas it is noted that a control plane path may be formed through the base station and the core network. Control information exchanged through the control plane path may be information related to session management, authentication, authorization, security and charging. As shown in the example of FIG. 3(a), in case of ProSe communication of UEs served by different eNodeBs, control information on UE-1 may be exchanged with a control node (for example, MME) of the core network through eNodeB-1, and control information on UE-2 may be exchanged with the control node (for example, MME) of the core network through eNodeB-2. As shown in the example of FIG. 3(b), in case of ProSe communication of UEs served by the same eNodeB, control information on UE-1 and UE-2 may be exchanged with the control node (for example, MME) of the core network through eNodeB-1.

Figure 4:
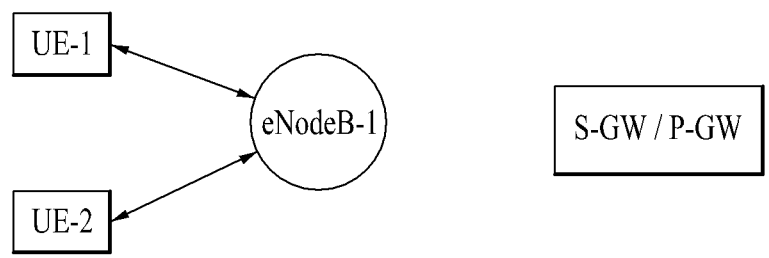
FIG. 4 is a diagram illustrating a locally-routed data path between two UEs based on ProSe.

FIG. 4 is a diagram illustrating a locally-routed data path between two UEs based on ProSe. As shown in the example of FIG. 4, a ProSe communication data path between UE-1 and UE-2 is formed through eNodeB-1 but does not pass through a gateway node (that is, EPC) operated by an operator. Meanwhile, in case of the control plane path, if the locally-routed data path of UEs served by the same eNodeB is configured as shown in FIG. 4, control information on UE-1 and UE-2 may be exchanged with the control node (for example, MME) of the core network through eNodeB-1.

In the present invention, the communication path described with reference to FIG. 3 and FIG. 4 may be referred to as a direct data path, a data path for ProSe, a ProSe based data path, or a ProSe communication path. Also, communication through the direct data path may be referred to as direct communication, ProSe communication, or ProSe based communication.

As described above, an architecture and operation of a 3GPP network for supporting ProSe service has not been discussed in the related art. The present invention intends to suggest signaling of a control plane for enabling operator/network control. In particular, the present invention intends to suggest a control mechanism that generates a direct data path between a node and a base station of a network under the control of the node and the base station when the user equipment (UE/user/subscriber) recognizes/discovers its counter user equipment to use ProSe service and intends to establish the direct data path, and notifies the network node of the generated result and various kinds of information related to the ProSe service. Also, the present invention intends to suggest a control method of a ProSe relation of the direct data path if there is any change in a geographical or logical location (for example, in the case that one or more of two or more user equipments intend to perform handover to a target base station or in the case that a distance within a cell area of a serving base station is increased to be more than a predetermined value) between two or more user equipments which are in a ProSe relation of the direct path generated as above.

Embodiment 1

Embodiment 1 relates to a control mechanism for allowing two or more user equipments to use ProSe service.

Figure 5:
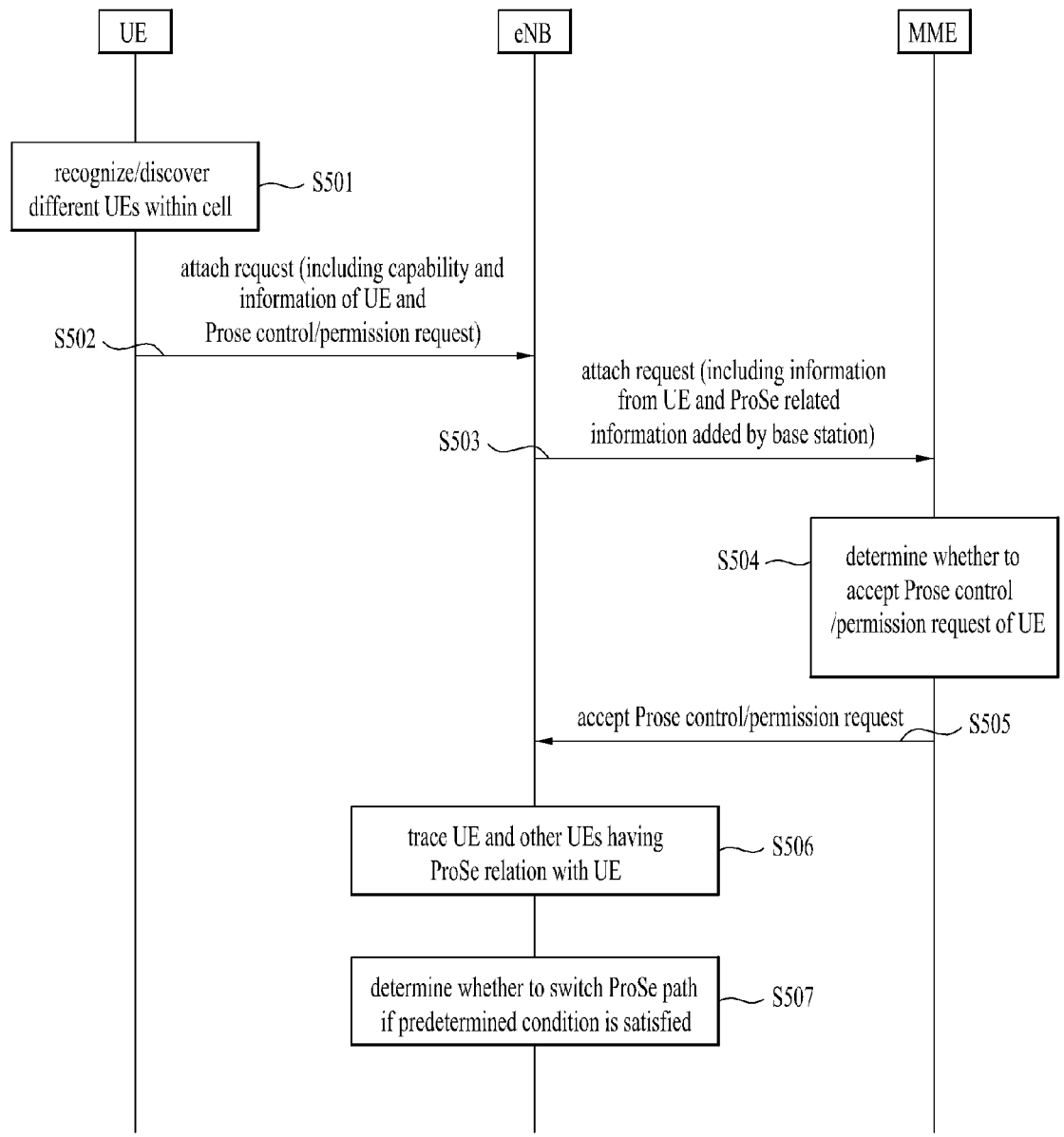
FIG. 5 is a flow chart illustrating ProSe related control signaling according to one embodiment of the present invention.

At step S501 of FIG. 5, the user equipment may recognize/discover the counter user equipment for ProSe service. In this case, it is assumed that the user equipments have ProSe capability.

At step S502, the user equipment may transmit a ProSe control or permission request to the network together with its capability and/or capability enable/disable state information. In this case, the user equipment may transmit a request of detailed direct data path configuration as well as the ProSe control or permission request to the network implicitly or directly. In other words, the user equipment may request preference, rejection or permission as to whether one or more base stations or one or more another user equipments may be included during direct data path configuration. If additional capability of the user equipment is required in accordance with the direct data path configuration, information as to whether corresponding capability will be supported and enable/disable state information may be transmitted.

At step S503, the base station that has received a control signal such as attach request from the user equipment may transmit the control signal to the MME together with information related to ProSe, which may be added by itself, by using S1AP (protocol between the base station and the MME).

Existing various control signals such as TAU/RAU and Handover as well as attach request may be used as the control signal or S1AP message transmitted from the user equipment, or a newly defined signal may be used as the control signal or S1AP message. In this case, the information related to ProSe, which may be added by the base station, may include information as to whether a function of the base station that may support ProSe is set and status information as to whether the base station may support ProSe requested from the corresponding user equipment.

The information as to whether the function of the base station that may support ProSe is set will be described in more detail. The function that may support ProSe may be physical or logical functionality. The base station may support the corresponding service by directly/indirectly involving in setup of direct data (path) communication for ProSe and/or actual data transmission during setup of direct data (path) communication and/or actual data transmission. Also, the base station may support the corresponding service by directly/indirectly involving in discovery of another user equipment that may use ProSe. The case of direct/indirect involvement of the base station that may support ProSe may include a case where one or more base stations may exist on the direct data path. In other words, the function of the base station, which is required to support the direct data path for passing through one or more base stations or one or more user equipments, may be set in advance, or may be varied in accordance with intention (operator policy) of a home/local operator. Also, a condition for enabling/disabling the function of the base station may be set in advance separately from the function of the base station. In other words, the operator or the network may use the corresponding function by enabling or disabling the corresponding function in accordance with a status (for example, in accordance with a specific condition, or indication from another core network node including a user equipment/another base station).

The status information as to whether the base station may support ProSe requested from the corresponding user equipment will be described in more detail. A reference for determining the status as to whether the base station may support ProSe requested from the corresponding user equipment may be defined by comparing one or more of various statuses of the following Table 2 with capability of the base station and capability threshold which is set in advance. The capability of the base station may be varied statically or dynamically by the operator policy.

TABLE 2 i) The function that may support ProSe is supported unconditionally if the function is set.
ii) If the function that may support ProSe is segmented into various functions, support of ProSe may be varied depending on the segmented functions. In other words, the function of the base station that may monitor and process/collect various kinds of information for ProSe, the function of the base station that may feed various kinds of information back to the user equipment directly or indirectly, or the function of one or more base stations or user equipments may be included in the direct data path may correspond to the segmented functions.
iii) The number of user equipments that currently camp on within a cell area of the base station.
iv) The number of user equipments that may support ProSe and currently camp on within a cell area of the base station. In this case, the number of user equipments that may support ProSe is an accumulated value of the time when individual user equipments are attached and may be managed directly by the base station, or may be used as a reference for determination in accordance with related information received from another network if this information is recognized by not the base station but another network node such as MME. This information may be acquired by a direct request, or may be acquired implicitly in advance through another control message.
v) The number of user equipments that currently perform ProSe communication within a cell area of the base station and/or the number of sessions. If this information is the information that cannot be recognized by the base station, this information may be used as the reference for determination on the basis of the information acquired from another network node such as MME.
vi) Types of sessions and/or bearers that currently perform ProSe communication within a cell covered by the base station, types of media, types of access which is used, the amount and/or time of data which are subjected to communication (or requested for communication), etc.
vi) Congestion status of a cell area of the base station or congestion status of neighboring network nodes.

At step S504, the MME may determine whether to accept a ProSe control or permission request from the user equipment. In more detail, the MME may determine whether to accept the request of the user equipment on the basis of at least one or more of subscriber information of the user equipment from the third physical/logical network node for ProSe or HSS, capability of the user equipment/network, which is required to perform a corresponding service, enable/disable state of the corresponding capability, home/local operator policy, preference of the user equipment, and information previously set in the network.

At step S505, the MME may transmit a response to the ProSe control or permission request to the user equipment. Also, the MME may set up the direct data path if necessary and transfer the set direct data path to the user equipment. If the MME accepts the ProSe control or permission request, the MME transmits a response message to the request message transmitted from the user equipment at step S502 to the base station, wherein the response message includes indication information (for example, ProSe Service Operation Possible=Possible') indicating that the MME accepts the ProSe control or permission request. The base station that has received the response message stores user equipment context and recognizes that the base station should perform control of ProSe for the user equipment. This control may include discovery of another user equipment that may use ProSe, and/or scheduling for direct data path communication, and/or handover between direct data path communication and infrastructure communication.

At step S506, the base station may trace activity of two or more user equipments that perform communication related to ProSe. The base station may perform control of ProSe for the corresponding user equipment on the basis of the indication received at step S505. However, the base station may perform control of ProSe for the corresponding user equipment even though the steps S503, S504 and S505 are omitted.

At step S506, if one or more of two or more user equipments performs handover to a target base station while the base station is tracing activity of the user equipment, or if a distance (physical distance or logical distance) within a cell area of a serving base station is increased to be more than a predetermined value, the base station may perform handling of the direct data path according to the aforementioned steps at step S507. In more detail, the base station may determine whether to switch the direct data path in case of at least one or more of i) the status that one of two or more Prose-enabled user equipments that camp on the base station intends to depart from coverage of the base station or all the user equipments intend to move to different target base stations by departing from coverage of the base station, ii) the status that all of two or more Prose-enabled user equipments that camp on the base station intend to move to the same target base station by departing from coverage of the base station or one user equipment is determined to be located at a proximate distance that may maintain the direct data path even though the user equipment departs from coverage of the base station, iii) the status that all of two or more Prose-enabled user equipments that camp on the base station intend to move the same target base station by departing from coverage of the base station or two user equipments are located apart from each other at a constant distance or more even though the two user equipments do not depart from coverage of the base station, iv) the status that a new second user equipment, which maintains infrastructure communication with a first user equipment that camps on the base station, camps on the same base station to which the first user equipment belongs. Hereinafter, the aforementioned statuses will be described in more detail.

Embodiment 2-1

In the status that one of two or more Prose-enabled user equipments that camp on the base station intends to depart from coverage of the base station or all the user equipments intend to move to different target base stations by departing from coverage of the base station, the base station may determine to switch the direct data path to an infrastructure data path. In other words, the status corresponds to a case where any one of two or more user equipments intends to perform handover or all the two or more user equipments intend to perform handover, and if two or more target base stations exist, the base station may determine to switch the direct data path to the infrastructure data path.

Figure 6:
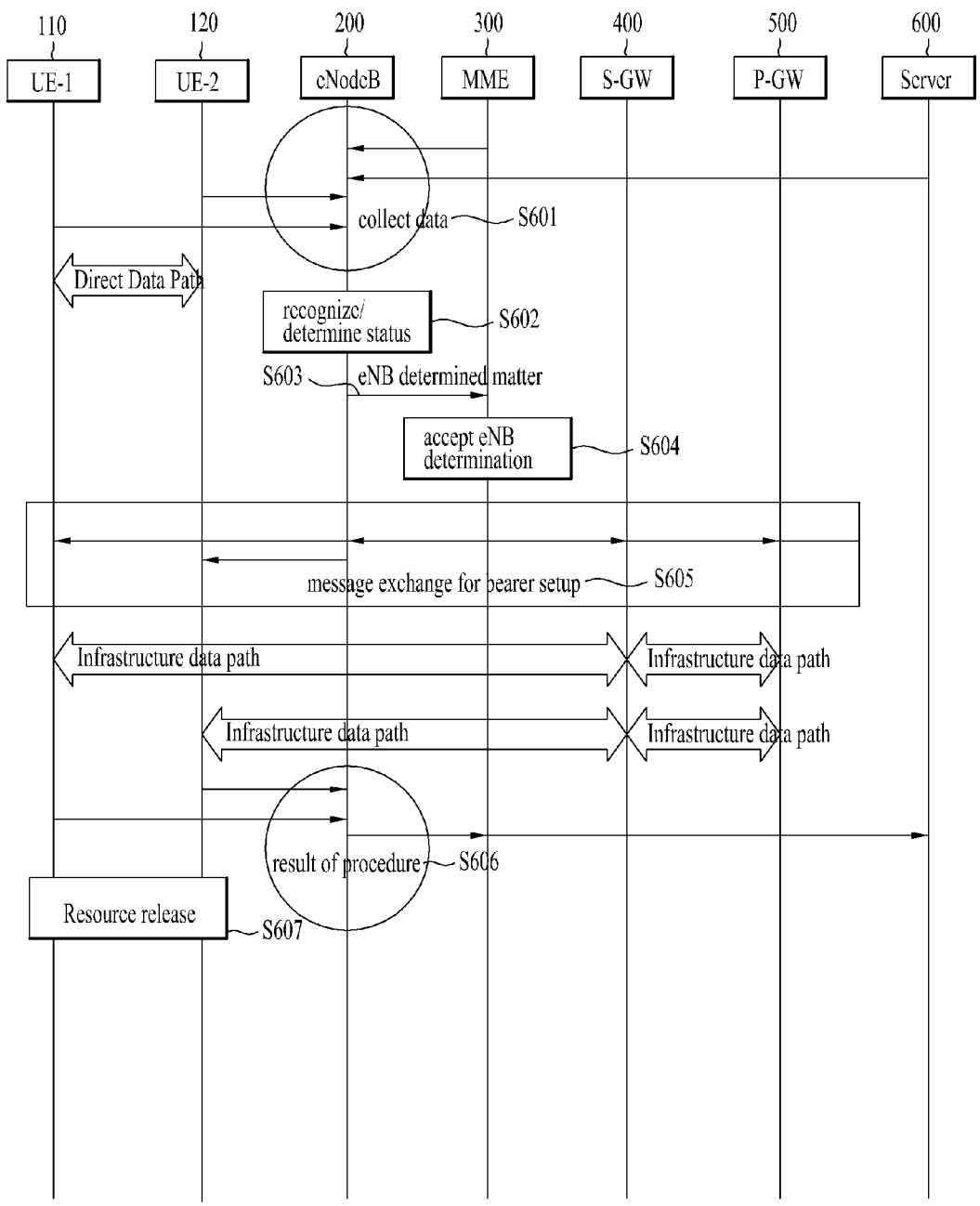
FIG. 6 is a diagram illustrating an embodiment that a direct data path is changed to an infrastructure data path through a ProSe related control solution according to one embodiment of the present invention.

This will be described for each step with reference to FIG. 6. In FIG. 6, two user equipments UE-1 110 and UE-2 120 are defined as an example of the two or more user equipments.

At step S601, the base station 200 may acquire measurement reports from the UE-1 110 or the UE-2 120, and/or may acquire one or more of i) subscriber information of UE-1 100 and UE-2 120, ii) capability of the user equipment/network, which is required to perform a corresponding service and/or enable/disable state of the corresponding capability, iii) home/local operator policy, iv) preference of the user equipment and pre-configuration information of the network NW, and v) congestion status of the core network and/or congestion status of the base station from another network node such as another base station (not shown), MME 300 and the third network node 600 (for example, HSS or specific server for ProSe). These kinds of information may be received by a request, or may be transferred without any request. These kinds of information may be transferred during the procedure according to the related art, or may be acquired by a new step for the present invention. At step S602, the base station 200 may determine whether to switch the direct data path, through which two or more user equipments are performing communication, to the infrastructure data path. This determination is not required to be performed by the base station only, and the base station may notify the user equipment of the status so that the user equipment may determine path switching. Alternatively, the base station may notify the MME of the status so that the MME may determine path switching (that is, core network node based solution of network based solution). If the MME determines path switching, a procedure similar to the procedure of determining the ProSe control or permission request may be performed during attach request.

When path switching from the direct data path to the infrastructure data path is determined, one or more of information illustrated in the following Table 3 may be used as a reference for determination. If path switching is determined by the user equipment or the MME, the information of the following Table 3 may be transferred to the user equipment or the MME in advance or at the same time. Alternatively, the information of the following Table 3 may be owned in advance by a determination entity.

TABLE 3 i) Subscriber information of two or more user equipments UE-1 (110) and UE-2 (120) having ProSe relation
ii) Capability of user equipment/network, which is required to perform corresponding service
iii) enable/disable state of corresponding capability
iv) home/local operator policy
v) preference of user equipment
vi) pre-configuration information of network
vii) pre-configuration policy of base station and/or its preference

TABLE 3-continued ix) network environment that may be made by infrastructure communication (for example, information considered when existing one PDN connection is newly generated, such as congestion status of core network and congestion status of base station)

x) granularity during determination as to whether to generate infrastructure communication, wherein granularity may be session/media unit. For example, all sessions or some of the sessions may be switched in accordance with media features, and the other may be dropped. Alternatively, granularity may be similar to that when direct data path is generated.

At step S603, if the base station/user equipment/MME determines to switch/generate the direct data path to the infrastructure data path on the basis of the aforementioned information, the result may be transferred to the MME 300.

At step S604, the MME 300 may check whether to accept the determined result from the base station 200, that is, the determined result of switching from the direct data path to the infrastructure data path between the UE-1 110 and the UE-2 120. In particular, it is hereinafter assumed that the MME accepts the determined result. The reference for determination at the MME 300 may be equal to that at the step S602.

At step S605, the MME 300 may generate the infrastructure data path by performing a procedure similar to a network triggered service request procedure (that is, recognizing that downlink data notification is received). In this case, if the user equipment already maintains connection with corresponding PDN for another service, the procedure of generating the infrastructure data path of a bearer unit may be performed. In other words, the existing bearer may be corrected, or a new bearer may be added. The existing schemes may be applied to other information (for example, APN, QoS parameter, etc.) required for switching to the infrastructure data path.

At step S606, after the infrastructure data path is generated as above, the result of the procedure may be transferred to the corresponding user equipments UE-1 110 and UE-2 120, the base station 200, the MME 300 or the third network node (for example, HSS or specific server for ProSe). If the setup status for the direct data path has been recorded previously, the record may be updated (for example, setup status that there is no direct data path between two user equipments any more). The procedure may be performed by combination or one or more of many steps, and may be started from the network node such as the base station 200 and the MME 300 not the UE-1 110 or the UE-2 120.

At step S607, a synchronization procedure between two paths may be performed, and then a procedure of releasing the existing direct data path/resource may be performed.

In the aforementioned description of FIG. 6, it is assumed that the UE-1 and the UE-2 camp on the same base station. However, the aforementioned description may be applied to a case where the UE-1 and the UE-2 are switched to infrastructure communication in the middle of performing direct communication by camping on different base stations, a case where the UE-1 and the UE-2 are switched to infrastructure communication as they camp on different base stations in the middle of performing direct communication by camping on the same base station, and a case where the UE-1 and the UE-2 are switched to infrastructure communication as they camp on the same base station in the middle of performing direct communication by camping on different base stations.

Embodiment 2-2

In the status that all of two or more Prose-enabled user equipments that camp on the base station intend to move to the same target base station by departing from coverage of the base station or one user equipment is determined to be located at a proximate distance that may maintain the direct data path even though the user equipment departs from coverage of the base station, the base station may determine to maintain the direct data path. In other words, the status corresponds to a case where all of two or more user equipments intend to perform handover, a case where one target base station exists, or a case where any one of two or more user equipments intends to perform handover. If a distance between the two or more user equipments is less than a predetermined distance even after handover is performed, the base station may determine to maintain the direct data path.

Figure 7:
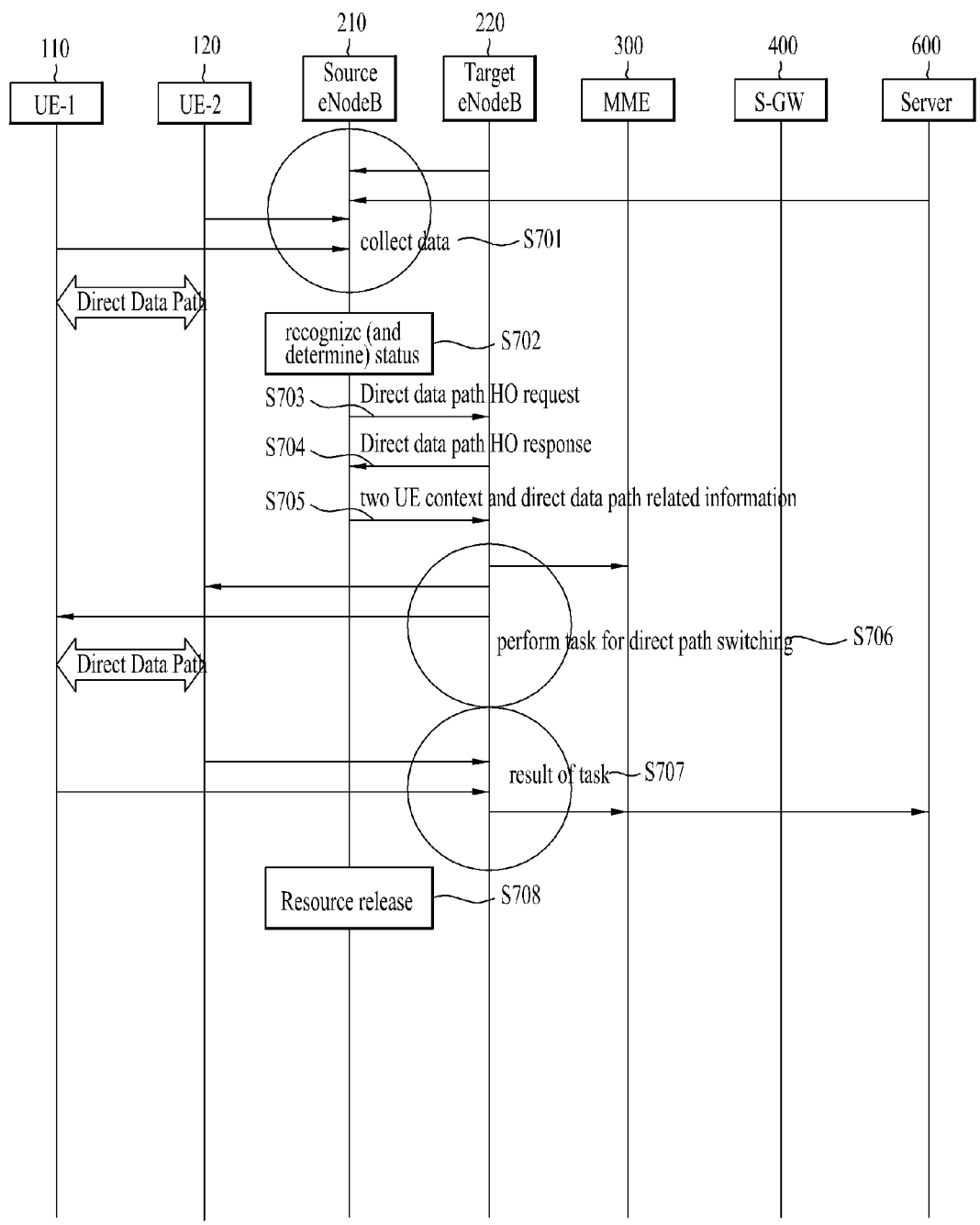
FIG. 7 is a diagram illustrating an embodiment that a direct data path is maintained through a ProSe related control solution according to one embodiment of the present invention.

This will be described with reference to FIG. 7. In the following embodiment, although interaction between the base stations assumes X2 interface, a procedure based on interaction with the existing MME may be accompanied if S1 based interaction is required.

At step S701, the base station 200 may acquire measurement reports from the UE-1 110 or the UE-2 120, and/or may acquire one or more of i) subscriber information of UE-1 100 and UE-2 120, ii) capability of the user equipment/network, which is required to perform a corresponding service and/or enable/disable state of the corresponding capability, iii) home/local operator policy, iv) preference of the user equipment and pre-configuration information of the network NW, and v) congestion status of the core network and/or congestion status of the base station from another network node such as another base station (not shown), MME 300 and the third network node 600 (for example, HSS or specific server for ProSe). These kinds of information may be received by a request, or may be transferred without any request. These kinds of information may be transferred during the procedure according to the related art, or may be acquired by a new step for the present invention. At step S702, the base station 200 may determine whether to maintain the direct data path, through which two or more user equipments are performing communication. This determination is not required to be performed by the base station only, and the base station may notify the user equipment of the status so that the user equipment may determine whether to maintain the path. Alternatively, the base station may notify the MME of the status so that the MME may determine whether to maintain the path. If the MME determines whether to maintain the path, a procedure similar to the procedure of determining the ProSe control or permission request may be performed during attach request.

When the base station, the user equipment, or the MME determines whether to maintain the direct data path, one or more of information illustrated in the above Table 3 may be used as a reference for determination. If determination of path switching is made by the user equipment or the MME, the information of the above Table 3 may be transferred to the user equipment or the MME in advance or at the same time.

At step S703, if the base station determines to maintain the direct data path between two or more user equipments, the base station may transmit a handover request message for the direct data path as a similar message to a handover (HO) request message of the existing LTE/LTE-A to check capability of the target base station and the network status. The handover request message for the direct data path may be the message that a new field is added to the existing handover request message. Alternatively, the handover request message may be a newly defined message. The handover request message for the direct data path may include one or more of i) identifier (ID) information that may recognize one or more user equipments of direct data path relation, ii) information indicating direct data path context, that is, indicating a session/flow for which the direct data path is formed, iii) statistical information such as history information on a corresponding element if accumulated data is required for charging, and v) information related to charging or QoS, which should be maintained.

At step S704, the target base station transmits a response message to the handover request message for the direct data path in accordance with its current capability and the network status. The information of the step S503 of FIG. 5, which is related to ProSe that may be added by the base station, may be used as a reference for determination during response to the handover request message for the direct data path.

At step S705, if the base station receives a positive acknowledgement from the target base station, the base station may transmit context related to ProSe between the two or more user equipments. At step S706, the target base station that has received the context may generate context related to ProSe required to maintain the direct data path and perform support required for the base station. If necessary, the target base station 220 may exchange information and requests required for setup of the direct data path with the UE-1 100 or the UE-2 120 and the MME.

Otherwise, unlike the above steps, if the target base station maintains another infrastructure data path having no relation with ProSe, a handover procedure of the existing LTE/LTE-A may be performed. In this case, the base station may perform a path switch request and a user plane update request to the MME. At this time, feedback information on a new status related to ProSe between two or more user equipments may be transferred to the MME. This feedback information may be used to update the setup status of the direct data path, which is stored in the network nodes.

Otherwise, separately from update of the result of the handover procedure, information on a new status related to ProSe between the UE-1 110 and the UE-2 120 may independently be transferred to the UE-1 110 or the UE-2 120, the base station 210 or 220, the MME 300, or the third network node (for example, HSS or specific server for ProSe). If the setup status of the direct data path has been recorded, the record may be updated.

At step S708, after performing handover for the direct data path to the target base station, the base station may release the corresponding context and related resource. A synchronization procedure between the direct data path and the maintained direct data path may be performed if necessary in accordance with issue of data redundancy.

Embodiment 2-3

In the status that all of two or more Prose-enabled user equipments that camp on the base station intend to move the same target base station by departing from coverage of the base station or two user equipments are located apart from each other at a constant distance or more even though the two user equipments do not depart from coverage of the base station, the base station may determine to switch the direct data path to a 'locally routed' direct data path through a local base station or a direct data path having a multihop path function through another user equipment.

Detailed description of this embodiment may depend on the aforementioned embodiment 2-2.

Embodiment 2-4

In the status that a new second user equipment, which maintains infrastructure communication with a first user equipment that camps on the base station, camps on the same base station to which the first user equipment belongs, the base station may determine to switch the infrastructure path to the direct data path, whereby service continuity may be provided.

The base station may recognize the aforementioned status by acquiring measurement reports from the user equipment and/or acquiring information from the network node (for example, another base station, MME, S-GW/P-GW, or separate server).

Switching of the direct data path and the infrastructure data path may be determined by the serving base station or the MME. If switching of the direct data path and the infrastructure data path is determined by the base station, the information of the step S503 of FIG. 5, which is related to ProSe that may be added by the base station, may be used as a reference for determination. If switching of the direct data path and the infrastructure data path is determined by the MME, this determination may be performed similarly to the procedure of determining the ProSe control or permission request during attach request.

In the aforementioned embodiments, the statuses between the user equipments that camp on the cell covered by the same base station have been described. However, if communication may be performed through the direct data path between the user equipments that camp on cells covered by different base stations, the aforementioned embodiments may be applied to the communication through cooperation between the base stations and/or between the MMEs.

In performing the operation of the aforementioned steps S501 to S506 in the method for controlling direct communication for ProSe as suggested in the present invention, the existing messages (Attach Request/Attach Accept/Attach Complete, TAU Request/TAU Accept, Service Request, Extended Service Request, PDN connectivity request, etc.) may be used, or a message newly defined for the present invention may be used. If the existing messages are used, a new field/parameter may be defined, or the existing field/parameter may be used through extension.

The present invention may be applied to the whole UMTS/EPS mobile communication system including 3GPP access network (for example, UTRAN/GERAN/E-UTRAN) and non-3GPP access network (for example, WLAN). Also, the present invention may be applied to all the wireless mobile communication system environments including the environment to which network control is applied.

The network mentioned in the present invention may be one or more various nodes, and its examples may include a mobile management node such as MME and SGSN, AAA server/AAA proxy, a server for Proximity Service, HSS, ANDSF, base station, gateway node such as P-GW.

The aforementioned various embodiments of the present invention may independently be implemented, or two or more embodiments may simultaneously be implemented.

Figure 8:
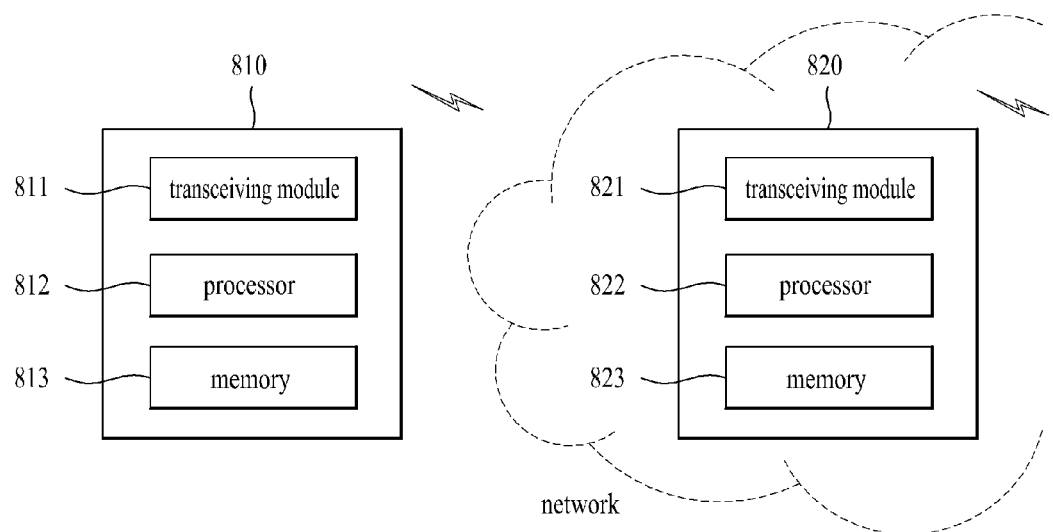
FIG. 8 is a diagram illustrating a preferred embodiment of a user equipment and a network node device according to one embodiment of the present invention.

FIG. 8 is a diagram illustrating a preferred embodiment of a user equipment and a network node device according to one embodiment of the present invention.

Referring to FIG. 8, the user equipment 810 according to the present invention may include a transceiving module

811, a processor 812, and a memory 813. The transceiving module 811 may be configured to transmit various signals, data and information to an external device and to receive various signals, data and information from the external device. The user equipment 810 may be connected with the external device through the wire and/or wireless. The processor 812 may control the overall operation of the user equipment 810, and may be configured to perform a function of operation-processing information to be transmitted to and received from the external device. The memory 813 may store the operation-processed information for a predetermined time, and may be replaced with a buffer (not shown).

The user equipment 810 according to one embodiment of the present invention may be configured for ProSe. The processor 812 may perform necessary processes for application of the aforementioned embodiments.

Referring to FIG. 8, the network node device 820 (especially, base station or target base station which is a serving cell mentioned in the aforementioned embodiments) according to the present invention may include a transceiving module 821, a processor 822, and a memory 823. The transceiving module 821 may be configured to transmit various signals, data and information to an external device and to receive various signals, data and information from the external device. The network node device 820 may be connected with the external device through the wire and/or wireless. The processor 822 may control the overall operation of the network node device 820, and may be configured to perform a function of operation-processing information to be transmitted to and received from the external device. The memory 823 may store the operation-processed information for a predetermined time, and may be replaced with a buffer (not shown).

The network node device 820 according to one embodiment of the present invention may be configured to support ProSe of the user equipment 810. The processor 822 may perform necessary processes for application of the aforementioned embodiments.

The details of the aforementioned user equipment 810 and the aforementioned network node device 820 may be configured in such a manner that the aforementioned various embodiments of the present invention may independently be applied to the aforementioned user equipment 810 and the aforementioned network node device 820, or two or more embodiments may simultaneously be applied to the aforementioned user equipment 810 and the aforementioned network node device 820, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various mobile communication systems.

The invention claimed is:

1. A method for a base station (BS) controlling a proximity service (ProSe) in a wireless communication system, the method comprising:
   recognizing at least two user equipments (UEs) which camp on the BS and have a ProSe relationship with each other via a direct data path; and
   determining whether to switch the direct data path when one or more of the at least two UEs intends to perform handover and transmits a handover request message or when a distance between the at least two UEs increases to greater than a predetermined value,
   wherein the direct data path is maintained and information related to the ProSe relationship between the at least two UEs is transmitted to a mobility management entity (MME) when any one of the at least two UEs performs handover and the distance between the at least two UEs is less than the predetermined value after the handover is performed.

2. The method according to claim 1, further comprising:
   receiving a request for ProSe control or permission for forming the direct data path; and
   transmitting the received request to the MME by including the information related to the ProSe relationship in the request.

3. The method according to claim 1, wherein the direct data path is switched to an infrastructure data path when any one of the at least two UEs performs handover and the distance between the at least two UE is greater than the predetermined value after the handover is performed.

4. The method according to claim 3, further comprising transmitting a result of the determination to a network node to generate the infrastructure data path.

5. The method according to claim 4, wherein the infrastructure data path is generated in a unit of bearer when the at least two UEs maintain a connection with the network node.

6. The method according to claim 1, wherein the direct data path is maintained when the at least two UEs intend to perform handover and transmit a handover request message when one target BS exists.

7. The method according to claim 6, further comprising transmitting a handover request message for the direct data path to the one target base station.

8. The method according to claim 7, wherein the handover request message includes at least identifiers of the at least two UEs, context information of the direct data path, history information, or quality of service (QoS) and charging related information.

9. The method according to claim 6, further comprising transmitting context related to the ProSe relationship to the one target BS when a message including a handover command is received from the one target BS.

10. The method according to claim 1, wherein the direct data path is switched to a direct data path via a local BS when the distance between the at least two UEs increases to greater than the predetermined value.

11. The method according to claim 1, wherein the direct data path is switched to an infrastructure data path when the at least two UEs intend to perform handover and transmit a handover request message when two target BS exist.

12. The method according to claim 1, wherein determining whether to switch the direct data path comprises considering at least subscriber information of the at least two UEs, capability information of the at least two UEs and a target base BS, enable/disable information of the capability information, a home/local operator policy, preference information, pre-configuration information of a network, a pre-configuration policy or preference information of the BS, or congestion status information of the network or BS.

13. The method according to claim 1, wherein determining whether to switch the direct data path is performed in a unit of session or flow.

14. The method according to claim 1, wherein the information related to the ProSe relationship includes at least information indicating whether a function of the BS that supports ProSe is set or status information indicating whether the BS supports a requested ProSe.

15. A base station (BS) for controlling a proximity service (ProSe) in a wireless communication system, the BS comprising:
a transceiving module configured to transmit and receive information; and
a processor configured to:
control the transceiving module;
recognize at least two user equipments (UEs) which camp on the BS and have a ProSe relationship with each other via a direct data path; and
determine whether to switch the direct data path when one or more of the at least two UEs intends to perform handover and transmits a handover request message or when a distance between the at least two UEs increases to greater than a predetermined value,
wherein the processor maintains the direct data path and controls the transceiving module to transmit information related to the ProSe relationship between the at least two UEs to a mobility management entity (MME) when any one of the at least two UEs performs handover and the distance between the at least two UEs is less than the predetermined value after the handover is performed.

16. The BS according to claim 15, wherein the controller is further configured to switch the direct data path to an infrastructure data path when any one of the at least two UEs performs handover and the distance between the at least two UEs is greater than the predetermined value after the handover is performed.

17. The BS according to claim 15, wherein the controller is further configured to maintain the direct data path when the at least two UEs intend to perform handover and transmit a handover request message when one target BS exists.

18. The BS according to claim 15, wherein the controller is further configured to switch the direct data path to a direct data path via a local BS when the distance between the at least two UEs increases to greater than the predetermined value.

19. The BS according to claim 15, wherein the controller is further configured to switch the direct data path to an infrastructure data path when the at least two UEs intend to perform handover and transmit a handover request message when two target BS exist.

20. The BS according to claim 15, wherein determining whether to switch the direct data path comprises considering at least subscriber information of the at least two UEs, capability information of the at least two UEs and a target base BS, enable/disable information of the capability information, a home/local operator policy, preference information, pre-configuration information of a network, a pre-configuration policy or preference information of the BS, or congestion status information of the network or BS.

* * * * *